United States Patent
Saitou et al.

(10) Patent No.: US 10,339,405 B2
(45) Date of Patent: Jul. 2, 2019

(54) IMAGE RECOGNITION DEVICE AND IMAGE RECOGNITION METHOD

(71) Applicant: PANASONIC INTELLECTUAL PROPERTY MANAGEMENT CO., LTD., Osaka (JP)

(72) Inventors: Shigeru Saitou, Kyoto (JP); Hiroshi Murase, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/960,050

(22) Filed: Apr. 23, 2018

(65) Prior Publication Data
US 2018/0247148 A1    Aug. 30, 2018

Related U.S. Application Data

(63) Continuation of application No. PCT/JP2016/005037, filed on Dec. 1, 2016.

(30) Foreign Application Priority Data

Dec. 8, 2015  (JP) ................................. 2015-239726

(51) Int. Cl.
*G06K 9/00* (2006.01)
*G06K 9/32* (2006.01)
(Continued)

(52) U.S. Cl.
CPC ....... *G06K 9/3233* (2013.01); *G06K 9/00369* (2013.01); *G06K 9/00805* (2013.01);
(Continued)

(58) Field of Classification Search
None
See application file for complete search history.

(56) References Cited

U.S. PATENT DOCUMENTS

| 2012/0076361 A1 | 3/2012 | Fujiyoshi |
| 2016/0105636 A1 | 4/2016 | Guo et al. |

FOREIGN PATENT DOCUMENTS

| CN | 102737370 A | 10/2012 |
| CN | 103714321 A | 4/2014 |
(Continued)

OTHER PUBLICATIONS

International Search Report issued in International Patent Application No. PCT/JP2016/005037, dated Feb. 28, 2017; with English translation.
(Continued)

*Primary Examiner* — Stephen P Coleman
(74) *Attorney, Agent, or Firm* — McDermott Will & Emery LLP

(57) ABSTRACT

An image recognition device includes: a camera unit that generates a distance signal and a luminance signal using reflected light from a plurality of subjects; an image generator that generates a range image from the distance signal and generates a luminance image from the luminance signal; and an image recognition processor that performs image recognition. The image recognition processor divides each of the range image and the luminance image into a plurality of regions, makes a determination, for each of the plurality of regions, as to whether the regions is a first region in which a specific object is clearly not present or a second region other than the first region, and performs image recognition processing on, among the plurality of regions, one or more regions other than the first region.

7 Claims, 13 Drawing Sheets

(51) Int. Cl.
*G06T 7/11* (2017.01)
*H04N 5/232* (2006.01)

(52) U.S. Cl.
CPC .......... *G06T 7/11* (2017.01); *H04N 5/23229* (2013.01); *G06K 2209/401* (2013.01)

(56) References Cited

FOREIGN PATENT DOCUMENTS

| | | | |
|---|---|---|---|
| JP | 2011-128756 A | 6/2011 | |
| JP | 5500559 B2 | 5/2014 | |
| WO | 2014/073322 A1 | 5/2014 | |
| WO | 2015/024362 A1 | 2/2015 | |
| WO | WO2015024362 * | 2/2015 | ............... G06T 7/11 |

OTHER PUBLICATIONS

Written Opinion of the International Searching Authority issued in International Patent Application No. PCT/JP2016/005037, dated Feb. 28, 2017; with English translation.
Crabb, Ryan, et al., "Real-time Foreground Segmentation via Range and Color Imaging," Computer Vision and Pattern Recognition Workshops, 2008, CVPR Workshops 2008. IEEE Computer Society Conference on, IEEE, Piscataway, N.J. USA, Jun. 23, 2008, pp. 1-5, XP031285726.
Extended European Search Report dated Oct. 23, 2018, issued in European Patent Application No. 16872611.5.
Office Action dated Jan. 24, 2019 along with a search report for the corresponding Chinese patent application No. 201680065134.9; with partial English translation.

\* cited by examiner

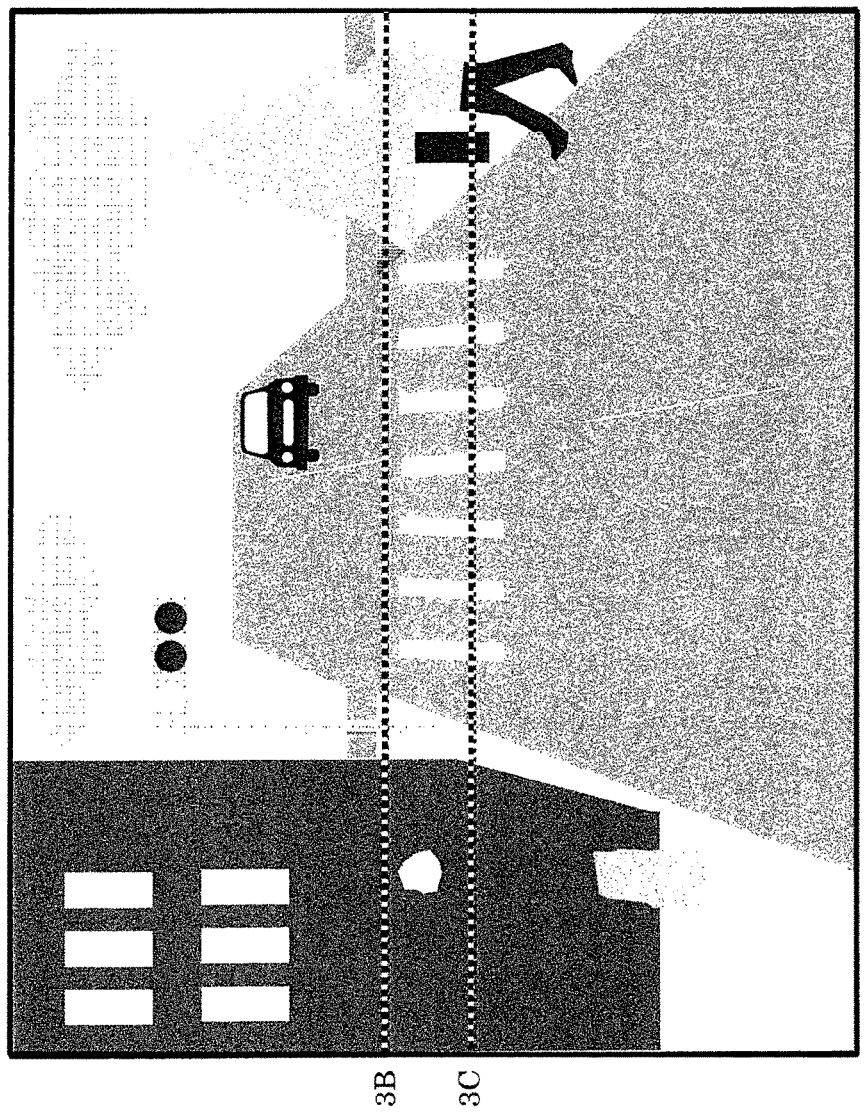

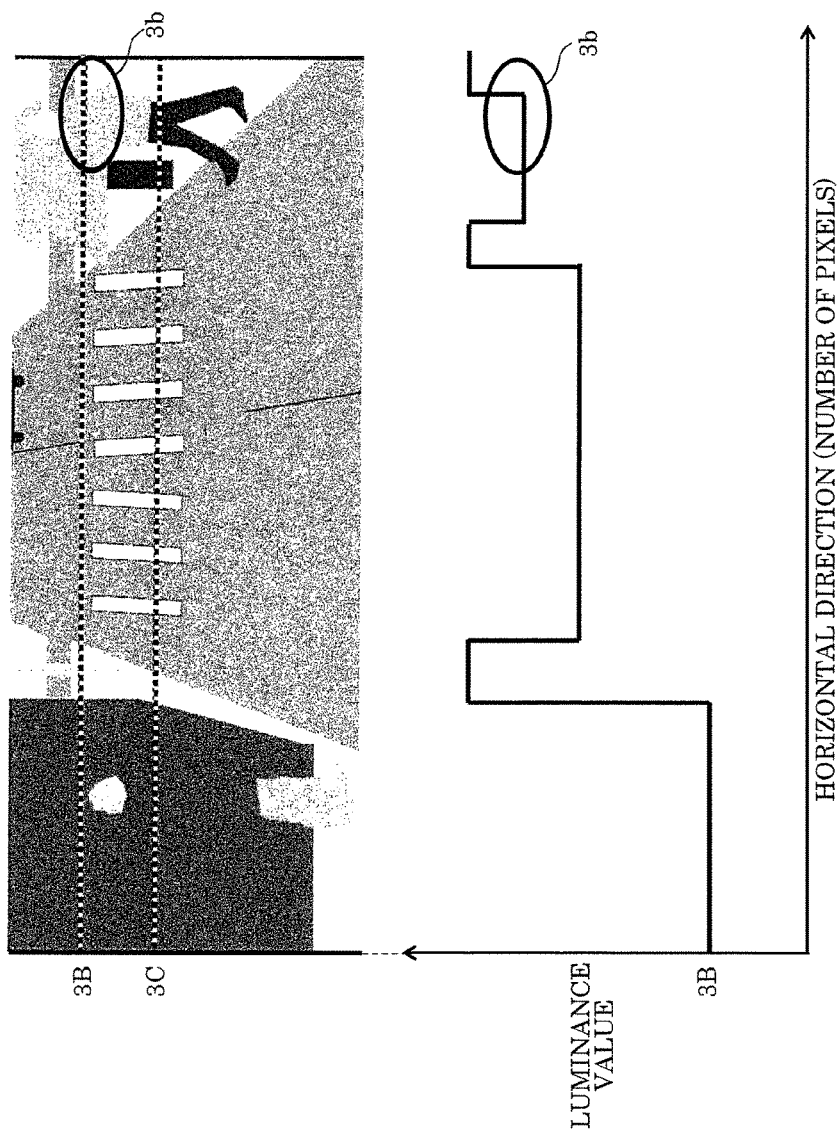

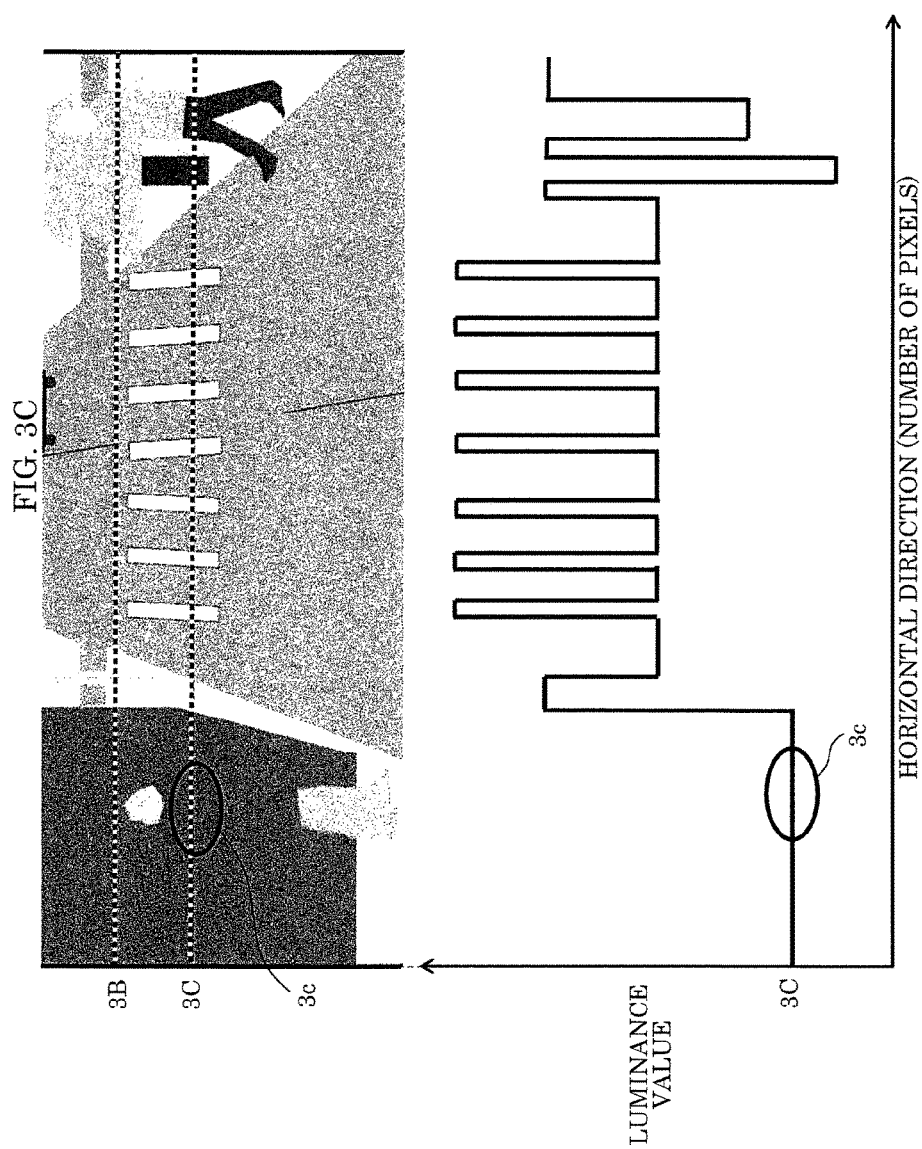

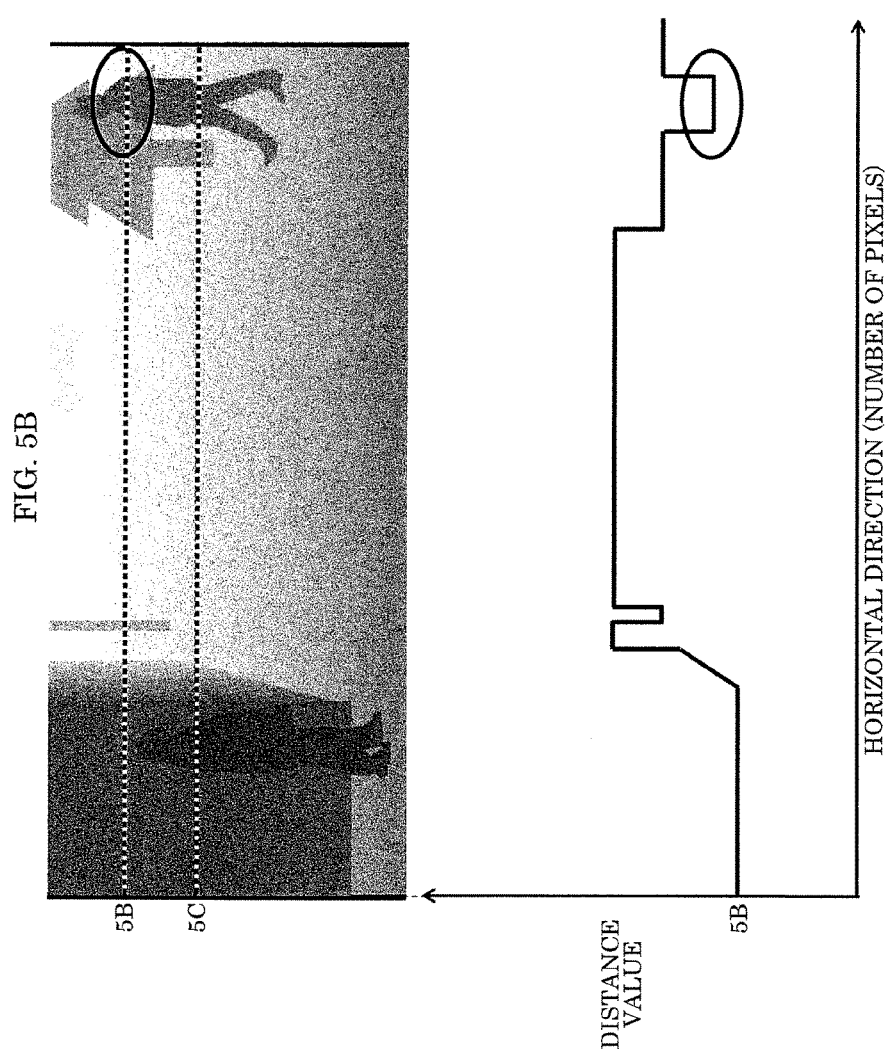

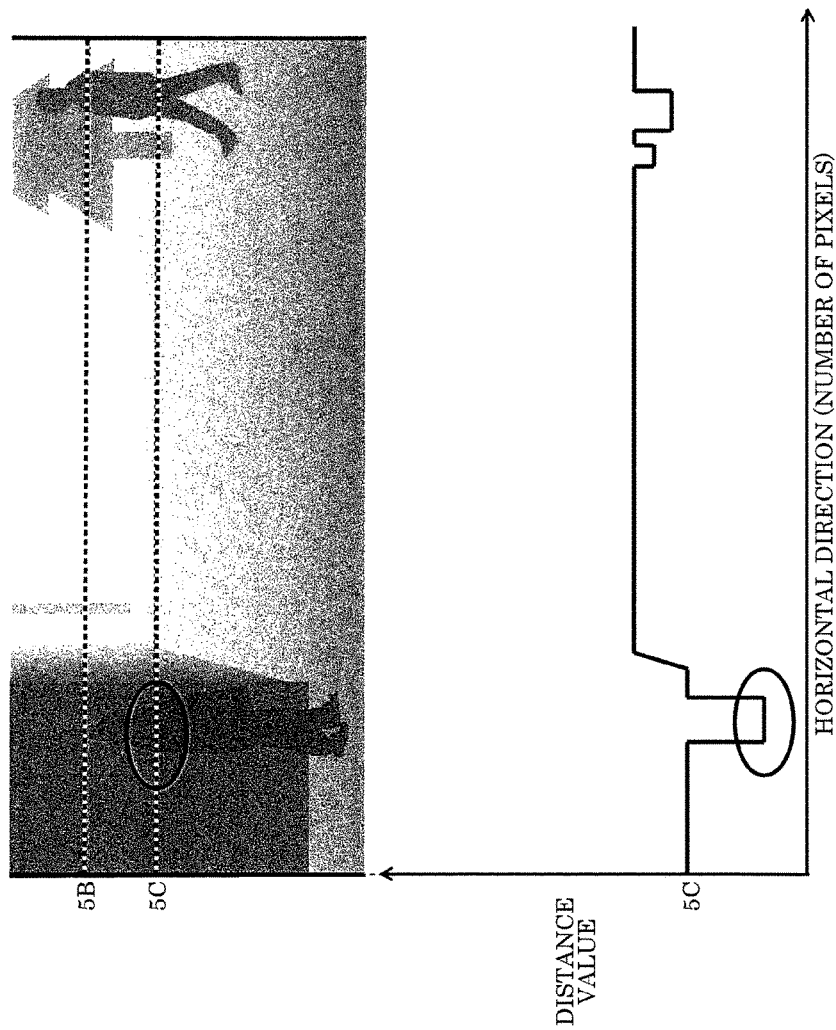

ered. For example, technology relating to human recognition is attracting great attention as technology applicable to car collision prevention, automatic driving, and others if the human recognition technology is adopted for a camera for a car.

IMAGE RECOGNITION DEVICE AND IMAGE RECOGNITION METHOD

CROSS REFERENCE TO RELATED APPLICATIONS

This application is a U.S. continuation application of PCT International Patent Application Number PCT/JP2016/005037 filed on Dec. 1, 2016, claiming the benefit of priority of Japanese Patent Application Number 2015-239726 filed on Dec. 8, 2015, the entire contents of which are hereby incorporated by reference.

BACKGROUND

1. Technical Field

The present disclosure relates to an image recognition device and an image recognition method.

2. Description of the Related Art

In recent years, research relating to technology on object recognition using an image captured by a camera has been actively conducted. For example, technology relating to human recognition is attracting great attention as technology applicable to car collision prevention, automatic driving, and others if the human recognition technology is adopted for a camera for a car.

In particular, a camera which can obtain not only a luminance image, but distance information has been attracting attention. The camera can detect the distance between a person and a car by three-dimensionally recognizing space using distance information of an image, and thus is expected to enable highly accurate human recognition.

For example, Japanese Patent No. 5500559 has proposed a human recognition method of recognizing a similarity between distance histograms as a feature quantity, in contrast to a conventional human recognition method in which a luminance gradient feature quantity is used. In this manner, a decrease in recognition accuracy is prevented even when a background is complicated with many objects and even when people overlap.

SUMMARY

However, a conventional human recognition method using a range image captured by a camera has a problem that the recognition speed decreases due to a long calculation processing time since a whole image which includes objects other than a person, such as background, is scanned for human recognition.

Consequently, one aspect of the present disclosure is intended to address the problem by providing an image recognition device and an image recognition method which reduce a decrease in detection speed even for a high resolution image and a decrease in recognition accuracy even for an image having a complicated background.

An image recognition device according to an aspect of the present disclosure is an image recognition device including: a camera unit that generates a distance signal and a luminance signal using reflected light from a plurality of subjects; an image generator that generates a range image from the distance signal and a luminance image from the luminance signal; and an image recognition processor that performs image recognition, wherein the image recognition processor: divides each of the range image and the luminance image into a plurality of regions; makes a determination, for each of the plurality of regions, as to whether the region is a first region in which a specific object is clearly not present or a second region other than the first region, and performs image recognition processing on, among the plurality of regions, one or more regions other than the first region.

An image recognition method according to an aspect of the present disclosure is an image recognition method including: generating, by imaging by a camera, a range image that includes pixel data indicating a distance value, and a luminance image that includes pixel data indicating a luminance value; dividing each of the range image and the luminance image into a plurality of regions; making a determination, for each of the plurality of regions, as to whether the region is a first region in which a specific object is clearly not present or a second region other than the first region; and performing image recognition processing on, among the plurality of regions, one or more regions other than the first region.

According to an aspect of the present disclosure, a decrease in detection speed can be reduced even when object detection is performed on a whole region of a high resolution image, and a decrease in recognition accuracy can be reduced even for an image having a complicated background.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3A is a diagram showing a luminance image which is obtained when the subjects shown in FIG. 2 are imaged by an image recognition device according to the embodiment;

FIG. 3B is a diagram showing luminance values along dotted line 3B in FIG. 3A;

FIG. 3C is a diagram showing luminance values along dotted line 3C in FIG. 3A;

FIG. 5B is a diagram showing distance values along dotted line 5B in FIG. 5A;

FIG. 5C is a diagram showing distance values along dotted line 5C in FIG. 5A;

DETAILED DESCRIPTION OF THE EMBODIMENT

The following describes an image recognition device according to embodiments with reference to the drawings.

However, unnecessarily detailed descriptions may be omitted.

For example, detailed descriptions on items already widely known and redundant descriptions regarding substantially the same configurations may be omitted. The purpose of the omission is to avoid unnecessary redundancy in the following descriptions, and to make the following descriptions readily understood by a person skilled in the art. Note that the accompanying drawings and the following description are provided in order that a person skilled in the art sufficiently understands the present disclosure, and thus are not intended to limit the subject matter of the claims.

Embodiment 1

Figure 1:
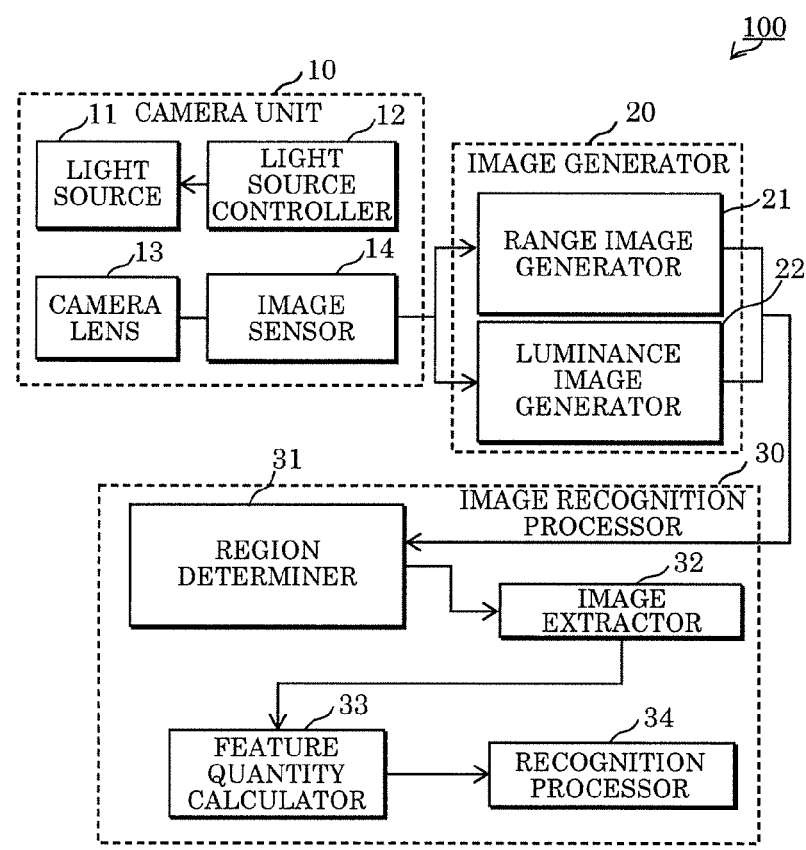
FIG. 1 is a block diagram showing an example of a configuration of an image recognition device according to an embodiment.

FIG. 1 is a block diagram showing an example of a configuration of an image recognition device according to an embodiment. Image recognition device 100 shown in FIG. 1 includes camera unit 10, image generator 20, and image recognition processor 30. Camera unit 10 includes light source 11, light source controller 12, camera lens 13, and image sensor 14. Image generator 20 includes range image generator 21 and luminance image generator 22. Further, image recognition processor 30 includes region determiner 31, image extractor 32, feature quantity calculator 33, and recognition processor 34.

Camera unit 10 generates a distance signal and a luminance signal using reflected light from a plurality of subjects.

Light source 11 is a light source which mainly emits light having a near-infrared wavelength (such as a light-emitting diode (LED) and a laser diode), and emits, under control of light source controller 12, pulsed light at a specific frequency.

Light source controller 12 causes light source 11 to emit pulsed light onto a subject, and causes reflected light passing through camera lens 13 to form an image on image sensor 14.

Image sensor 14 includes a plurality of two-dimensionally disposed pixels, each of which receives reflected light. A distance signal can be obtained by calculating a difference between a time when such reflected light reaches a pixel and a time when light source 11 emits light. For each of the pixels, a distance signal indicates a distance between a subject and camera unit 10 at the pixel, for example. Further, like a typical camera, image sensor 14 also obtains a luminance signal while light source 11 is emitting no pulsed light.

Image generator 20 generates a range image and a luminance image respectively from a distance signal and a luminance signal which are obtained by camera unit 10. Range image generator 21 generates a range image by calculating a difference between a time when such reflected light reaches a pixel and a time when light source 11 emits light. Like a typical camera, luminance image generator 22 generates a luminance image. In comparison with a typical camera, camera unit 10 is configured to additionally perform light emission control for measuring a distance using time of flight (TOF), and image generator 20 additionally includes range image generator 21.

Image recognition processor 30 is configured to exclude a first region in the luminance image and a first region in the range image from regions to be subjected to image recognition. Here, the first region refers to a region in which a specific object is clearly not present among all regions of the luminance image and the range image. The specific object typically refers to a person, but may refer to a bicycle or a two-wheel vehicle which a person is riding, a car which a person is driving, and an animal other than a person.

Firstly, in image recognition processor 30, region determiner 31 performs processing to divide an image, which includes subjects, into a plurality of regions using the luminance image and the range image.

Next, region determiner 31 determines, for each of the divided regions, whether the region is a first region or a second region other than the first region. A feature quantity which is to be used by feature quantity calculator 33 to identify an object is calculated from the second region, but not from the first region.

Image extractor 32 reflects a result of the determination by region determiner 31, and extracts an image from the second region.

Feature quantity calculator 33 calculates a feature quantity from only an image extracted by image extractor 32.

Recognition processor 34 performs recognition processing in accordance with the feature quantity calculated by feature quantity calculator 33.

Next, details of the above are to be described with reference to the drawings.

Figure 2:
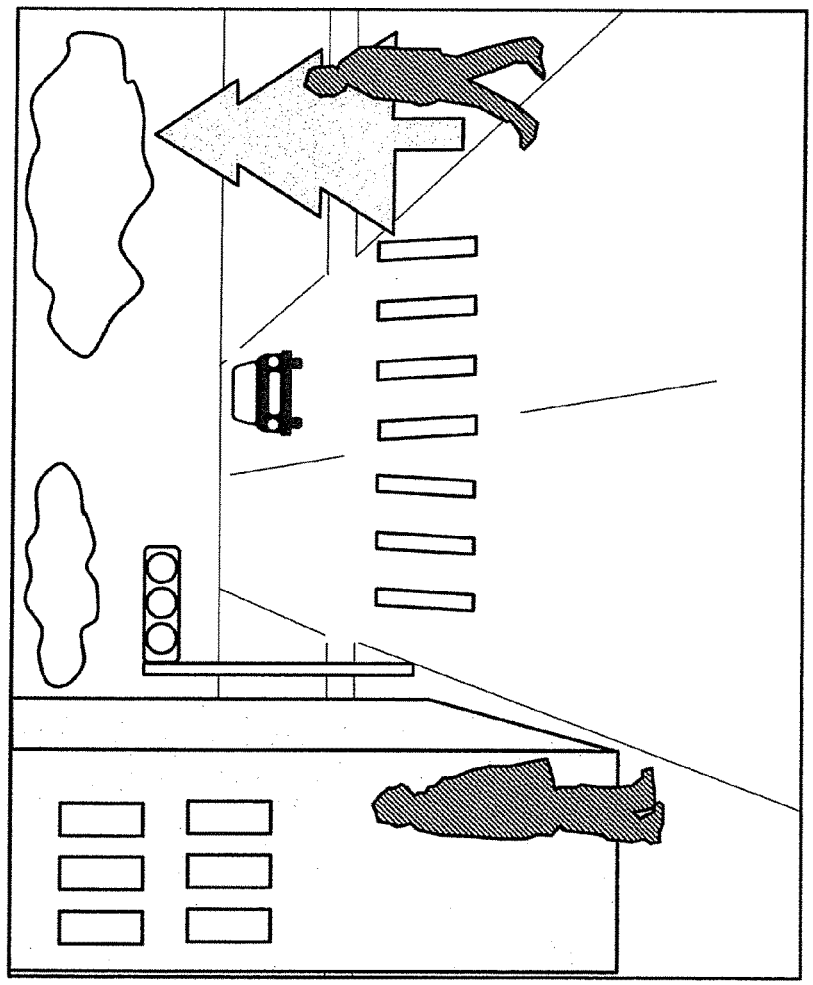
FIG. 2 is a diagram showing examples of conceivable subjects when imaged by a vehicle-mounted camera.

FIG. 2 is a diagram showing examples of conceivable subjects when imaged by a vehicle-mounted camera. The subjects in FIG. 2 include ordinary subjects such as pedestrians, a building, ground, a road, a car, a traffic light, a pedestrian crossing, a tree, sky, and clouds. Next, a luminance image and a range image obtained when image recognition device 100 images the subjects shown in FIG. 2 are to be described.

FIG. 3A is a diagram showing a luminance image which is obtained when the subjects shown in FIG. 2 are imaged by image recognition device 100. The luminance image contains pixel data which indicates luminance values. Here, contrasts of the subjects in FIG. 3A correspond to a luminance value indicated by a luminance signal, thus a brighter area has greater luminance values and a darker area has smaller luminance values.

Next, the division into regions where regions are divided using a luminance image, or in other words, extraction of boundaries of regions where boundaries of regions are extracted using a luminance image by region determiner 31 is to be described.

FIG. 3B is a diagram showing luminance values along dotted line 3B in FIG. 3A. FIG. 3C is a diagram showing luminance values along dotted line 3C in FIG. 3A. FIG. 3B and FIG. 3C are diagrams in which lateral axes are horizontal pixel rows along dotted lines 3B and 3C in FIG. 3A, respectively, and in which luminance values are plotted on longitudinal axes. Here, the division into regions where an image, which includes subjects, is divided into regions using luminance values illustrated in FIG. 3B as examples, or in other words, extracting boundaries (edges) of regions using luminance values illustrated in FIG. 3B as examples is to be described. Boundaries between a building and ground, ground and a road, and ground and a tree can be extracted by extracting boundaries from where a difference in luminance value is great, and dividing an image along the boundaries. Specifically a portion where adjacent pixels have a difference in luminance value of at least 5% to 10% is extracted as a boundary, yet such a value is arbitrarily set according to, for instance, noise of a camera, thus is not limited to the above.

However, in FIG. 3B, boundaries between ground and a pole of a traffic light and between a tree and upper body of a person cannot be extracted, and boundary extraction is difficult with only a luminance image. A luminance value indicated by a luminance signal is determined by the quantity of reflected light from a subject and sensitivity of a camera, and thus when the reflectances of subjects are equivalent or almost equivalent, even if the subjects are different, the luminance values of the subjects do not show a clear difference. Accordingly, the subjects overlap with each other, and boundaries (edges) of the subjects cannot be extracted. Similarly, as shown in FIG. 3C, when a difference in luminance value between a building and a person is small, extraction of the boundaries of the subjects is difficult with only a luminance image.

Figure 4:
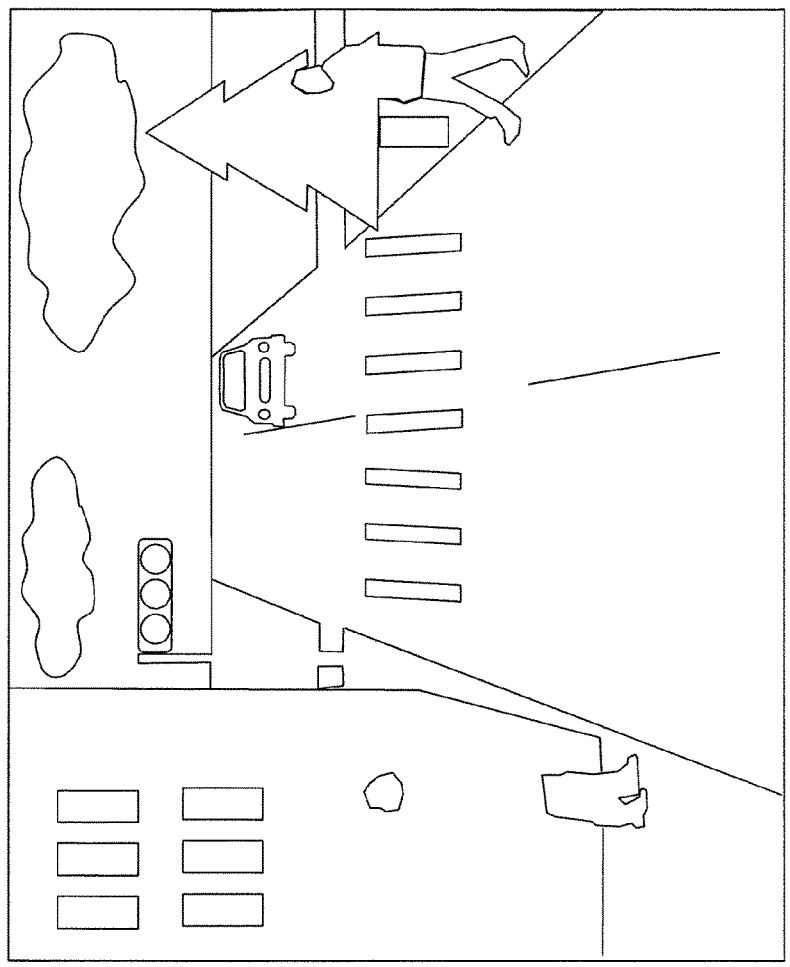
FIG. 4 is a diagram showing a result of extracting boundaries of the subjects using only a luminance image.

FIG. 4 is a diagram showing a result of extracting boundaries of subjects using only a luminance image. As is clear from FIG. 4, boundaries between a person and a tree (circled part 3b in FIG. 3B) and between a person and a building (circled part 3c in FIG. 3C), where there are no clear differences in luminance values, are not extracted. Accurate determination cannot be made if such boundary extraction of subjects is used to perform identification processing which is to be described later.

In view of the above, the present disclosure proposes image recognition device 100 which uses both a range image and a luminance image to accurately extract boundaries of subjects even when boundary extraction of subjects is difficult using only a luminance image.

Next, the division into regions where regions are divided using a range image, or in other words, extraction of boundaries of regions where boundaries of regions are extracted using a range image by region determiner 31 is to be described.

Figure 5A:
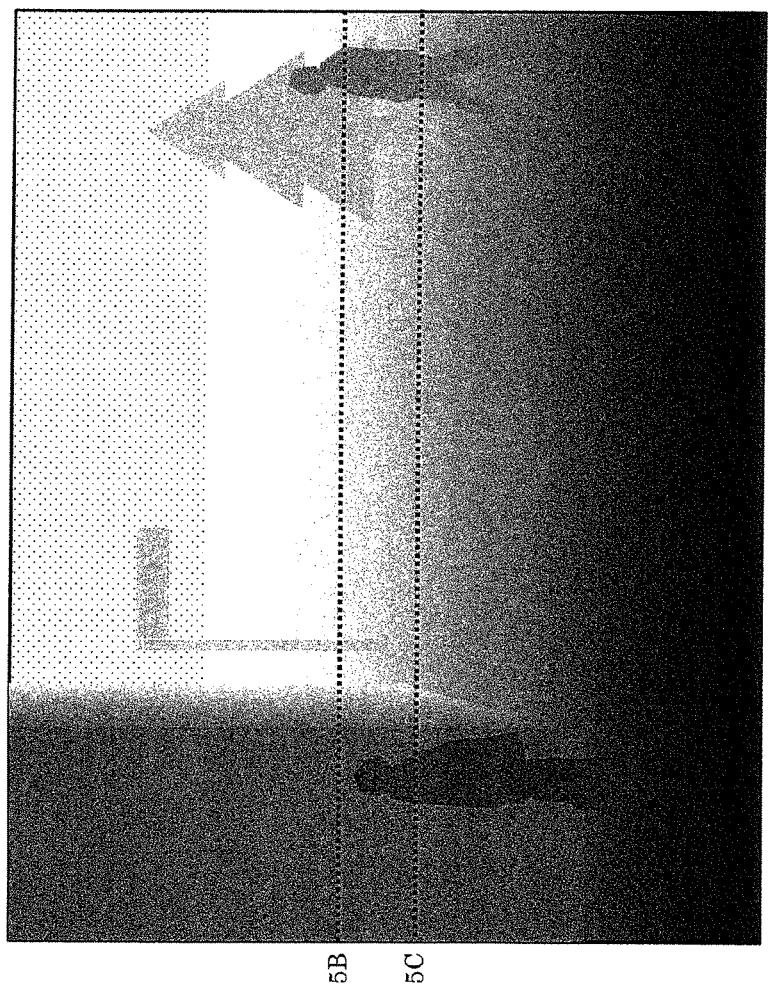
FIG. 5A is a diagram showing a range image obtained when the image recognition device according to the embodiment images the subjects shown in FIG. 2.

FIG. 5A is a diagram showing a range image obtained when image recognition device 100 images subjects shown in FIG. 2. A range image contains pixel data in which distance values are indicated. Here, the contrasts of subjects in FIG. 5A correspond to distances, and a brighter area indicates a subject farther away from image recognition device 100 and a darker area indicates a subject closer to image recognition device 100.

FIG. 5B is a diagram showing distance values along dotted line 5B in FIG. 5A. FIG. 5C is a diagram showing distance values along dotted line 5C in FIG. 5A. FIG. 5B and FIG. 5C are diagrams in which lateral axes are horizontal pixel rows along dotted lines 5B and 5C in FIG. 5A, respectively, and in which distance values are plotted on longitudinal axes. Note that dotted lines 5B and 5C are spatially at same positions as dotted lines 3B and 3C mentioned above, and thus the addresses of pixel values of the image sensor are same for all dotted lines 3B, 3C, 5B, and 5C. Accordingly, all luminance values and distance values are readily used. Here, boundary extraction of a subject is to be described using distance values illustrated in FIG. 5B as examples. Boundaries between a building and ground, ground and a pole of a traffic light, ground and a tree, and a person and a tree can be extracted by dividing an image at a portion where a difference in distance values is great, as a boundary of a subject. Specifically when a difference in distance value between adjacent pixels is at least 5% to 10%, or specifically when distance values between adjacent pixels shows an inclination (slope) having a difference of about 50% or higher, a boundary is extracted from between the adjacent pixels. Yet, such value is arbitrarily set according to, for instance, noise of a camera, thus is not limited to the above. In FIG. 5B, a boundary which cannot be clearly extracted from a luminance image is clearly extracted based on a difference in distance values of a tree and a person. Similarly, in FIG. 5C, a boundary can be extracted based on a difference in distance values of a building and a person.

Figure 6:
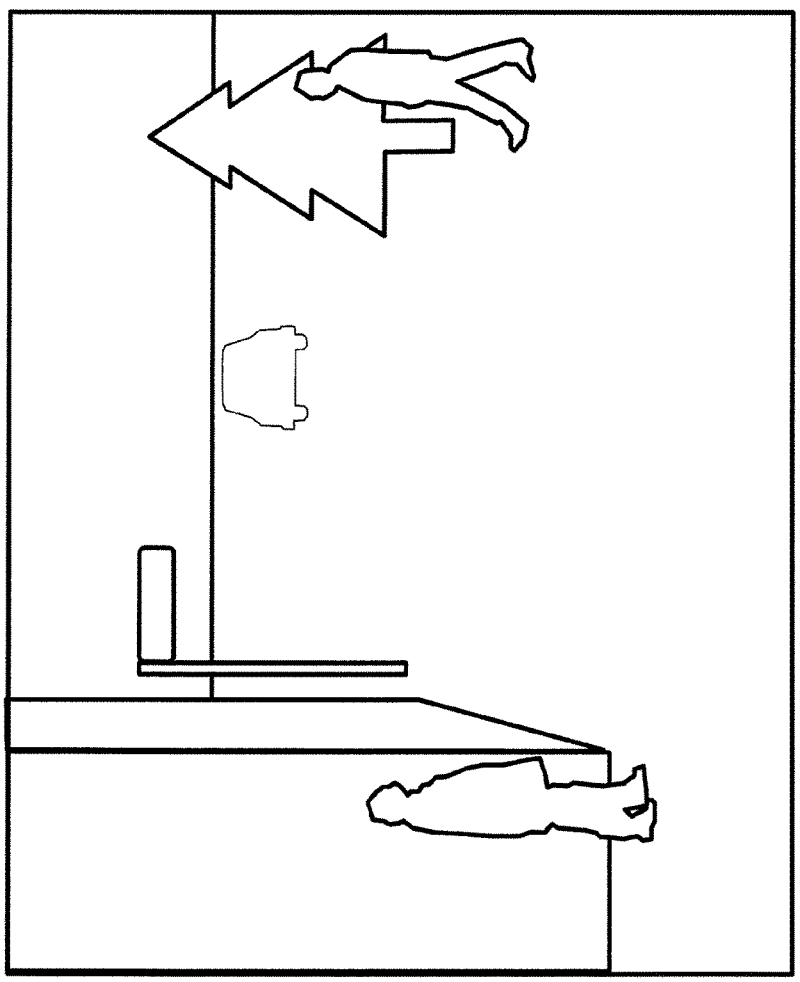
FIG. 6 is a diagram showing a result of extracting boundaries of the subjects using only a range image.

FIG. 6 is a diagram showing a result of extracting boundaries of subjects using only a range image. As is clear from FIG. 6, boundaries between a person and a building and between a person and a tree which cannot be extracted with only a luminance image can be extracted. However, with only a range image, it is difficult to extract boundaries between subjects which exhibit a small difference in distance value (small unevenness) such as boundaries between a road and ground and between a road and a pedestrian crossing. That is, identification of subjects such as ground and a road is difficult using only a range image.

Figure 7:
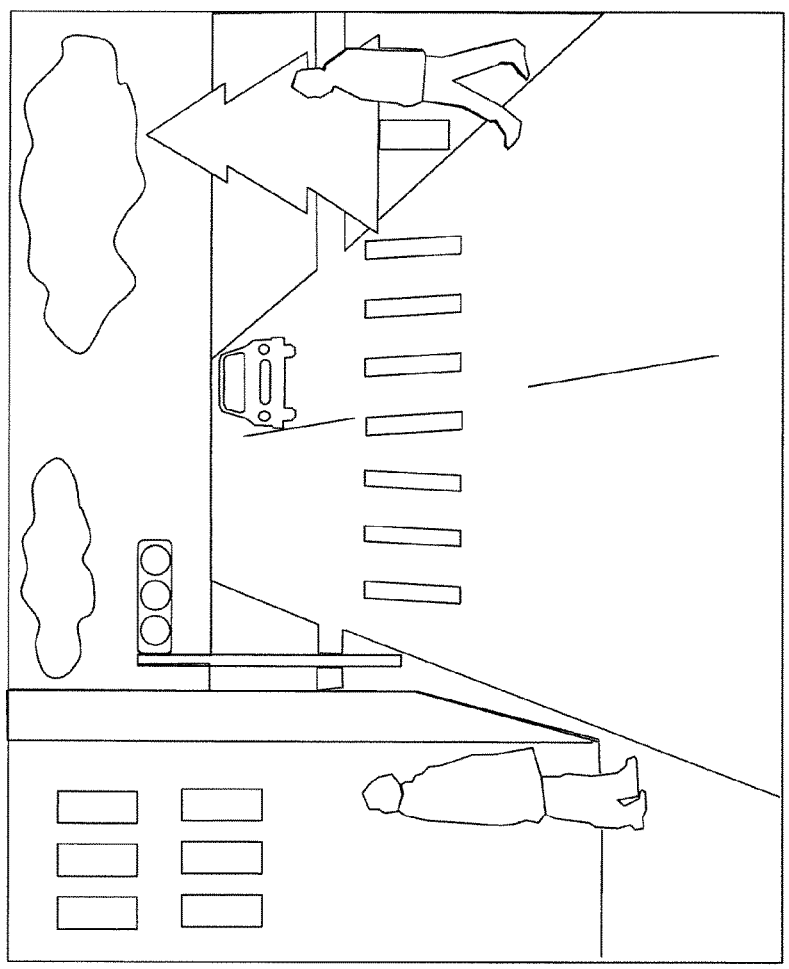
FIG. 7 is a diagram obtained by combining boundaries that are extracted using the luminance image and the range image.

Accordingly, region determiner 31 in image recognition device 100 combines dividing processing along boundaries of subjects using a luminance image and dividing processing along boundaries of subjects using a range image. That is, as shown in FIG. 7, boundaries of subjects can be accurately extracted by combining the boundaries extracted using a luminance image and a range image which include the subjects.

Camera unit 10 which measures distance using TOF and image generator 20 that are included in image recognition device 100 can obtain a luminance image and a range image optically coaxially, and thus optical axis correction, for instance, is unnecessary. This clearly shows that image recognition device 100 has advantages not only in the cost, but also in the recognition speed, compared to the case in which a luminance image and a range image are obtained separately with different cameras.

Figure 8:
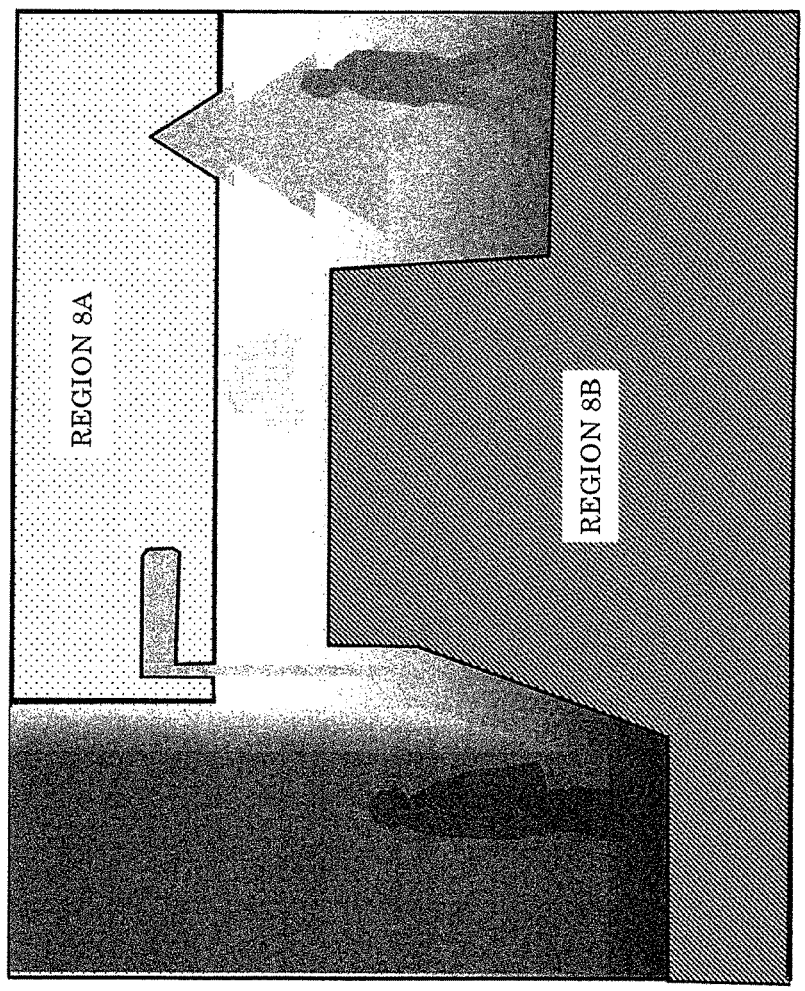
FIG. 8 is a diagram showing a first region among a plurality of regions divided along boundaries of the subjects which are extracted using the luminance image and the range image.

Further, region determiner 31 in image recognition device 100 determines, for each of divided regions, whether the region is a first region in which a specific object is clearly not present or a second region other than the first region. In other words, region determiner 31 performs, for each of the regions, determination processing of determining whether to calculate a feature quantity to be used to identify an object. Here, the above determination processing is to be described with an example of identifying a person as a specific object. FIG. 8 is a diagram showing a first region among a plurality of regions divided along boundaries of subjects extracted using a luminance image and a range image. That is, FIG. 8 is a diagram showing region 8A in which distance values are at least fixed values (here, at least X meter(s) which is the maximum measurable distance of a camera), and region 8B in which distance values change while maintaining a constant slope relative to a vertical pixel direction or a horizontal pixel direction, among regions divided along boundaries of subjects extracted using a luminance image and a range image shown in FIG. 7. That is, region 8A is a region which does not include a pixel that indicates a shorter distance than a predetermined value (for example, maximum measurable distance X m mentioned above) in a range image. Region 8B is a region where a difference in distance value between adjacent pixels is equal in a certain direction (for example, vertical direction in a range image).

Here, a region in which the distance values are at least the maximum measurement distance of a camera continues at an upper part of an image area like region 8A clearly shows sky or a background farther away, for instance. Thus, processing of recognizing a person as a specific object can be omitted for such a region. In addition, a region in which distance values vary while maintaining a constant slope like region 8B is determined as a region in which objects very low in height in a three-dimensional space are continuously located. Thus, the region can also be omitted from recognition processing to be performed on a person as a specific object, because a subject in the region is clearly ground (including a road herein). In other words, in comparison with a case, where feature quantities to be used for person identification processing have been conventionally calculated from the whole region of an image which includes subjects, image recognition device 100 further separates boundary regions of subjects obtained from a luminance image and a range image into regions in which feature quantity calculation is to be performed and regions in which feature quantity calculation is not to be performed. Consequently, calculation is omitted for regions for which calculation is unnecessary and thus improvement in calculation speed, that is, improvement in recognition speed is achieved. For example, when calculation for regions 8A and 8B in FIG. 8 is omitted by excluding regions 8A and 8B from regions to be subjected to feature quantity calculation, the recognition speed is expected to be almost two times faster than when the calculation is performed on the whole region of an image which includes subjects.

As described above, image recognition device 100 including: camera unit 10 that generates a distance signal and a luminance signal using reflected light from a plurality of subjects; image generator 20 that generates a range image from the distance signal and a luminance image from the luminance signal; and image recognition processor 30 that performs image recognition, wherein image recognition processor 30: divides each of the range image and the luminance image into a plurality of regions; makes a determination, for each of the plurality of regions, as to whether the region is a first region in which a specific object is clearly not present or a second region other than the first region, and performs image recognition processing on, among the plurality of regions, one or more regions other than the first region.

Accordingly, a decrease in detection speed can be reduced even for a whole region of a high resolution image on which object detection is performed, and a decrease in recognition accuracy can be reduced even for an image having a complicated background.

Here, image recognition processor 30 may make the determination based on distance values obtained from the range image divided into the plurality of regions.

Here, image recognition processor 30 may determine, as the first region, a region which does not include a pixel that indicates a shorter distance than a predetermined value, among the plurality of regions in the range image.

Accordingly, sky, and a background farther away, for example, can be included in the first region.

Here, image recognition processor 30 may determine, as the first region, a region in which adjacent pixels have an equal difference in distance value, among the plurality of regions in the range image.

Accordingly, ground and a road, for example, can be included in the first region.

Here, when a difference in distance value between adjacent pixels is at least a threshold, image recognition processor 30 may set, between the adjacent pixels, a boundary between the plurality of regions in the range image.

Accordingly, the accuracy of division into regions can be improved, because boundaries are found by distance values.

Here, camera unit 10 may include image sensor 14 that generates the distance signal and the luminance signal.

Accordingly, a luminance image and a range image are generated by a same camera, so that processing such as optical axis correction is unnecessary. Thus, advantages clearly lies not only in the cost, but also in recognition speed, compared to the case in which a luminance image and a range image are obtained separately with different cameras.

Figure 9:
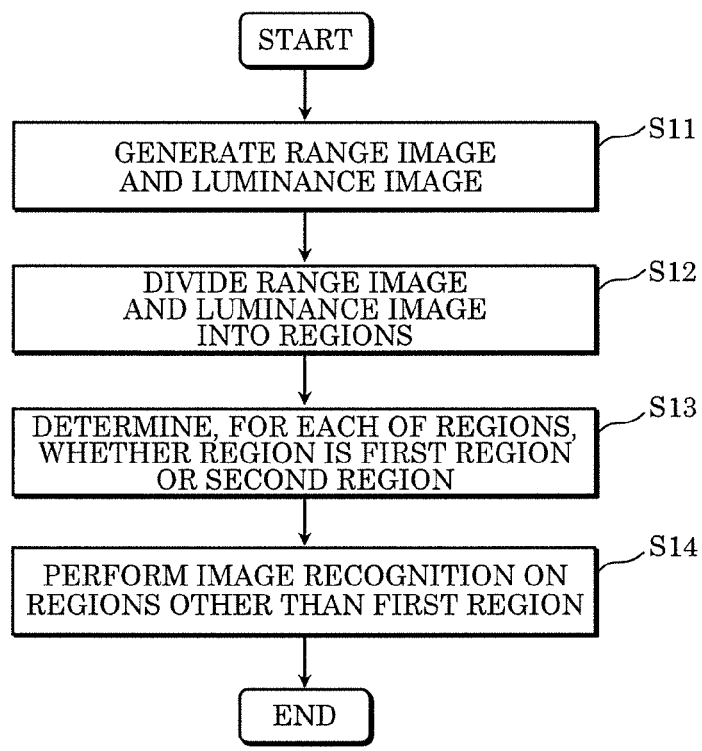
FIG. 9 is a flow chart of an image recognition method performed by the image recognition device according to the embodiment.

In addition, as shown in FIG. 9, an image recognition method which is performed by image recognition device 100 is the image recognition method including: generating, by imaging by a camera, a range image that includes pixel data indicating a distance value, and a luminance image that includes pixel data indicating a luminance value (S11); dividing each of the range image and the luminance image into a plurality of regions (S12); making a determination, for each of the plurality of regions, as to whether the region is a first region in which a specific object is clearly not present or a second region other than the first region (S13); and performing image recognition processing on, among the plurality of regions, one or more regions other than the first region (S14). FIG. 9 is a flow chart of the image recognition method which is performed by image recognition device 100.

The foregoing has described the image recognition device according to one or more aspects based on the embodiments, yet the present disclosure is not limited to such embodiments. Without departing from the scope of the present disclosure, various modifications, which may be conceived by a person skilled in the art, and embodiments achieved by combining elements in different embodiments may be encompassed within the scope of the one or more aspects.

For example in the embodiments above, each of the elements such as a light source controller and an image recognition processor may be configured of a dedicated hardware or realized by running a software program suitable for the element. The elements may each be realized by a program executor such as a central processing unit (CPU) or a processor reading and running a software program stored in a recording medium such as a hard disk or a semiconductor memory.

Note that a general or a specific aspect of the present disclosure may be realized by a system, a method, an integrated circuit, a computer program, or a computer readable recording medium such as a CD-ROM, and also by an arbitrary combination of systems, methods, integrated circuits, computer programs, and recording media.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

An image recognition device according to the present disclosure is suitably applicable as a sensor for mounting on a car, for example.

What is claimed is:
1. An image recognition device comprising:

a camera unit that generates a distance signal and a luminance signal using reflected light from a plurality of subjects;

an image generator that generates a range image from the distance signal and a luminance image from the luminance signal; and an image recognition processor that performs image recognition, wherein the image recognition processor:

divides the range image and the luminance image into a plurality of regions based on boundaries extracted from both the range image and the luminance image;

makes a determination, for each of the plurality of regions, as to whether the region is a first region in which a specific object is clearly not present or a second region other than the first region, and performs image recognition processing on one or more of the plurality of regions, wherein the image recognition processor does not perform image recognition processing on the region determined to be the first region.

2. The image recognition device according to claim 1, wherein when a difference in distance value between adjacent pixels is at least a threshold, the image recognition processor sets, between the adjacent pixels, a boundary between the plurality of regions in the range image.

3. The image recognition device according to claim 1, wherein the camera unit includes an image sensor that generates the distance signal and the luminance signal.

4. The image recognition device according to claim 1, wherein the image recognition processor makes the determination based on distance values obtained from the range image divided into the plurality of regions.

5. The image recognition device according to claim 4, wherein the image recognition processor determines, as the first region, a region which does not include a pixel that indicates a shorter distance than a predetermined value, among the plurality of regions in the range image.

6. The image recognition device according to claim 4, wherein the image recognition processor determines, as the first region, a region in which adjacent pixels have an equal difference in distance value, among the plurality of regions in the range image.

7. An image recognition method comprising:

generating, by imaging by a camera, a range image that includes pixel data indicating a distance value, and a luminance image that includes pixel data indicating a luminance value;

dividing the range image and the luminance image into a plurality of regions based on boundaries extracted from both the range image and the luminance image;

making a determination, for each of the plurality of regions, as to whether the region is a first region in which a specific object is clearly not present or a second region other than the first region; and performing image recognition processing on one or more of the plurality of regions, wherein the image recognition processor does not perform image recognition processing on the region determined to be the first region.

* * * * *